April 1, 1969   J. G. VINCENT, JR., ET AL   3,436,453
SURFACE DYED EDIBLE GELATIN CAPSULE WITH PIGMENT MARKING
Original Filed June 14, 1963
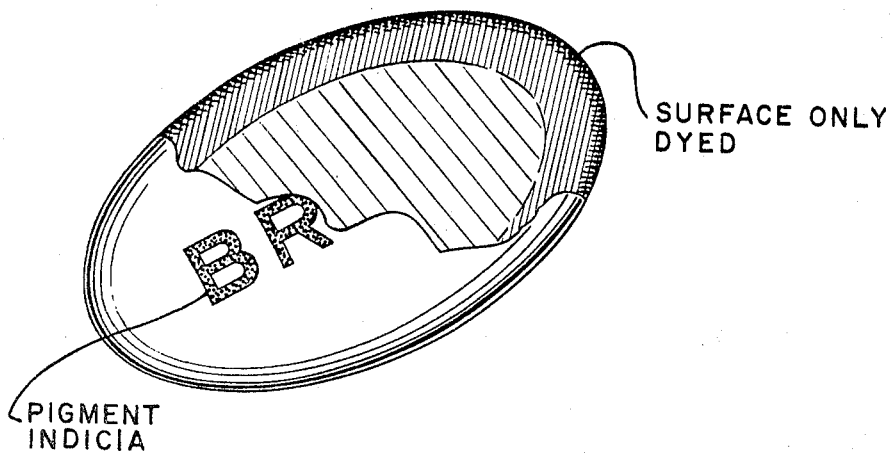
INVENTORS
JAMES G. VINCENT, JR.
LLOYD FRANK HANSEN
ERNEST CHU YEN
ARTHUR SINCLAIR TAYLOR
GEORGE SPENCER BOTT
MARTIN GREIF
BY
ATTORNEY United States Patent Office 3,436,453
Patented Apr. 1, 1969

3,436,453
SURFACE DYED EDIBLE GELATIN CAPSULE
WITH PIGMENT MARKING
James G. Vincent, Jr., West Nyack, Lloyd Frank Hansen, Campbell Hall, Ernest Chu Yen, Orangeburg, and Arthur Sinclair Taylor, Spring Valley, N.Y., and George Spencer Bott, Westwood, N.J., and Martin Greif, Bronx, N.Y., assignors to American Cyanamid Company, Stamford, Conn., a corporation of Maine
Original application June 14, 1963, Ser. No. 287,829, now Patent No. 3,333,031, dated July 25, 1967. Divided and this application July 24, 1967, Ser. No. 655,563
Int. Cl. A61k 9/04; B44c 1/02
U.S. Cl. 424—6                                    1 Claim

ABSTRACT OF THE DISCLOSURE

Soft gelatin capsules, for medical usage, are dyed on the surface only, and are marked with a pigmented indicia which may be lighter in color than the surface, whereby the quantity of dye ingested in administration of the capsule is markedly reduced.

---

This application is a division of Serial No. 287,829, filed June 14, 1963, now Patent 3,333,031, July 25, 1967, which discloses in detail one method and apparatus for producing the present capsule.

Related subject matter is disclosed and claimed in each of:

Patent 3,203,347, Aug. 31, 1965, Rotary Pigment Printer for Gelatin Strip for Capsules, Lloyd Frank Hansen and George Spencer Bott; on S.N. 287,842, filed June 14, 1963.

Patent 3,394,983, July 30, 1968, Dip-Dyeing Capsules, Martin Greif, Ernest Chu Yen, James G. Vincent, Jr., and Lloyd Frank Hansen; on S.N. 287,827, filed June 14, 1963.

Patent 3,394,677, July 30, 1968, Apparatus for Surface Dyeing of Capsules, Arthur Sinclair Taylor, Lloyd Frank Hansen, Ernest Chu Yen and James G. Vincent, Jr.; on S.N. 287,828, filed June 14, 1963.

Patent 3,395,202, July 30, 1968, Pigment Composition for Marking Gelatin Capsules, Ernest Chu Yen; on S.N. 287,841, filed June 14, 1963.

Patent 3,413,396, Nov. 26, 1968, Pigment Marking Gelatin Capsules, Carl Louis Stearns on S.N. 287,826, filed June 14, 1963.

Brief summary of the invention

This invention relates to surface dyed and surface marked soft gelatin capsules, in which substantially the surface only are colored, and a pigmented identifying indicia is marked on a portion of the capsule surface.

Ingestible one-piece capsules, usually referred to as soft gelatin capsules, can be formed on machines such as disclosed in United States Patent 2,697,317, Stirn and Taylor, "Capsule Forming Die Roll," Dec. 21, 1954, from which the formed capsules are discharged in a current of air by an air conveyor. The gelatin strip for the capsules is conveniently formed from a mixture of primarily gelatin, glycerin and water, together with minor quantities of pigments, flavors and odors as desired, by methods such as disclosed in United States Patents 2,799,591, Michel and Knight, "Rapid Preparation of Encapsulation Formula," July 16, 1957; or 2,799,592, Hansen and Weidenheimer, "Rapid Preparation of Encapsulation Mixture," July 16, 1957; or 2,720,463, Stirn and Taylor, "Gelatin Capsule Casting Composition Preparation," Oct. 11, 1955. The gelatin composition may have other components, such as disclosed in United States Patent 2,770,553, Weidenheimer and Callahan, "Soft Gelatin Encapsulation," Nov. 13, 1956, showing certain amides, such as formamide or acetamide present, and United States Patent 2,776,220, Reed, Ritter, Valentine and Yen, "Gelatin Films and Capsules Made Therefrom," Jan. 1, 1957.

Gelatin substituents may be used and hence the film in its broader sense is a pressure sealable plastic, referred to as plastic strip. Present commercial practice uses gelatin films exclusively—hence the invention is described with particular references to gelatin films.

Marking of capsules with a marking fluid during manufacture is disclosed in U.S. 2,624,163, Stirn, Method of Making Colored Gelatin Capsules, Jan. 6, 1953 and 2,821,821, Yen, Marking Gelatin Capsules, Feb. 4, 1958.

After manufacture, capsules have been dried in drum dryers, as disclosed in United States Patent 2,638,686, Stirn and Taylor, "Drying Gelatin Capsules," May 19, 1953.

Dyes are a foreign substance, not a natural food, so that the quantity to be ingested is preferably kept at a minimum.

The coloring of capsules is very useful for identification during manufacture, distribution and sale, and by the patient.

If the surface of the strip from which a capsule is formed is colored, during the cutting out procedures a narrow uncolored stripe remains at the line of the seal.

Our surface-dyed capsules can be formed from an undyed gelatin strip which may contain pigments such as titanium dioxide, calcium carbonate, barium sulfate or alumina, iron oxides or charcoal, to give either a white, gray or other color capsule and the outside surface only of the film forming the shell of the capsule is colored by dyeing—giving capsules having a markedly lower quantity of dye than would be the case if the entire film were dyed. The appearance is elegant.

The capsules are marked by printing with identifying indicia either before or after dyeing by an edible pigment. This may be suspended in a water-polyhydric alcohol composition using methyl cellulose or sodium carboxymethyl cellulose as a binder. Printing of the strip before the formation of the capsules is more convenient. An excellent marking composition consists of a suspension of a substantially water-insoluble non-toxic opaque material such as titanium dioxide, calcium carbonate or barium sulfate or iron oxide or charcoal suspended in an aqueous vehicle containing a polyhydric alcohol such as glycerin, propylene glycol, ethylene glycol, liquid polyethylene glycol or sorbitol with a small amount of a non-toxic surface active agent to maintain the pigment in suspension, aid penetration into the film, and aid in smooth spreading of the pigment composition on the marking type; and a water-soluble suspending and adhesive agent such as methyl cellulose or sodium carboxymethyl cellulose. Titanium dioxide is the strongest, and usually preferred pigment. Ethylene glycol is best used on capsules for other than ingestion, such as for dyes or bleaches.

The non-toxicity of propylene glycol renders propylene glycol the polyhydric alcohol of choice. Additionally, the volatility characteristics of propylene glycol are within a preferred range.

A particularly useful embodiment consist of titanium dioxide, propylene glycol, water, methyl cellulose and bis (2-ethylhexyl) sodium sulfosuccinate (Aerosol OT®).

Although the surface dyeing may be accomplished as a separate step, it is advantageous to accomplish the dyeing as part of a continuous operation. Labor and handling is minimized, the entire coloring is part of a single manufacturing operation under the control of a minimum crew, and the possibility of confusion of identity before dyeing is eliminated.

Any dye which is soluble in a solvent compatible with the film composition can be used. Water-soluble dyes can be added in water but usually dyes are preferred which are soluble in mixtures of lower alcohols and water as such dyes penetrate into the capsule surface more readily and the solvent system can be evaporated from the capsules.

For non-medicinal purposes any dyestuff may be used which has a satisfactory solubility and color. For most purposes non-toxic dyes are preferred. Among the dyes which are presently acceptable for food and drug use are those described in the article entitled, "Colors for Food, Drugs and Cosmetics," published in the Encyclopedia of Technology, The Interscience Encyclopedia, Inc., 1949, vol. 4, pages 287–313. This encyclopedia describes the production and use of various colors, giving the name and formula for the Food, Drug and Cosmetic dyes which are soluble colors. The FD & C alcohol-soluble dyes there listed are excellent for present purposes. Whereas dyes not presently known to be non-toxic can be used, and are acceptable on proof of non-toxicity, the time and cost of proof of non-toxicity is such that for commercial purposes the dyes known to be acceptable are very much a matter of choice.

The capsules may be surface dyed after being dried, using the tumbling process; or may be dyed either wet or dry by immersion for controlled lengths of time in dye solutions of known strength.

The quantity of dye to be used can vary over very wide limits. The strength of the dye and the depth of color required, for a preferred value and chroma, are controlling factors. For any specific batch of capsules, a rather precise quantity of dye is equired so that the finished capsules match arbitrary standards within acceptable limits.

The reduction in dye content of surface-dyed capsules over film-dyed capsules in which the entire film is colored, is at least about 70% and usually more. Reproducibility of color is excellent.

A water-soluble flavor or perfume can be added to the dye solution to introduce a flavor or odor.

The figure is a representation of the surface-colored surface-marked capsule.

The carrier for the pigment is a mixture of water and a polyhydric alcohol. For best results, from about 30 to 60% of propylene glycol is preferred. Titanium dioxide gives excellent results in the range of from about 10 to 20% and the remainder is largely water.

About 0.5% to 3% of a suspending and binding agent is preferred. Methyl cellulose is the suspending and binding agent of choice as it forms a film binding the pigment to the surface of the capsule which is flexible and sufficiently hard without being brittle and is thus both rub resistant and chip resistant. Low viscosity methyl cellulose is preferred. A methoxyl content of from 20% to 32% gives good results. Sodium carboxymethyl cellulose and other water-soluble non-toxic adhesive suspending agents give good results.

A water-soluble preferably non-toxic wetting agent increases the rate of penetration into the surface of the gelatin strip and improves the bond. Non-toxic wetting agents such as polyoxyethylene sorbitan monooleate, polyoxyethylene-polyoxypropylene condensation polymers (Pluronic F–68), sodium lauryl sulfate, and polyoxyethylene stearate give good results. Sodium bis(2-ethylhexyl) sulfosuccatie is preferred; it is well known to have extremely low toxicity. A concentration of about 0.05% of the wetting agent is preferred. A range of at least 0.005 to 2% is effective. The exact quantity varies in part with the state of subdivision of the pigment, and the degree of agitation and time of storage before use. Sufficient agent to maintain suspension and give a rapid penetration in the film and give smooth non-puddling spreading on the type is preferred.

A current list of wetting agents is given in an article by John W. McCutcheon, "Synthetic Detergents and Emulsifiers—up to Date III," Soap and Chemical Specialties, July, August, September and October 1955. This list is expanded in "Detergents and Emulsifiers 1963 Annual," John W. McCutcheon, Inc., 236 Mt. Kemble Avenue, Morristown, N.J., 1963. The surfactants there listed can be used for suspension of the pigments, but where toxicity is a problem, only those known to be non-toxic are acceptable. Rather than prove non-toxicity of some other surfactant, some form of bis(2-ethylhexyl) sulfosuccinic acid, such as its sodium salt, or polyoxyethylene sorbitan monooleate or polyoxyethylene stearate or other agent known to be non-toxic is preferred.

Where desired, other non-toxic pigments, including iron oxides, charcoal, and the insoluble lakes of toxico-logically approved dyes may be used independently or in combination with titanium dioxide. The lakes of the dyes acceptable for surface dyeing the capsules are acceptable pigments.

As common in pharmaceutical practice, percentages are based on volume of liquids anw weights of solids. Where not otherwise specified, the abbreviation w./v. for weight solids/volume of liquid, based on unit density for water, or v./v. is used in part for clarity.

Example 1

A gelatin mix was prepared as described in Example 5 of United States Patent 2,799,591, supra, except that the red dye and red pigment were omitted. The gelatin was cast as a continuous strip and capsules were formed therefrom, as described in United States Patent 2,697,317, supra.

Forty-eight parts of titanium dioxide pigment were mixed with 72 parts of propylene glycol and passed through a three-roller paint mill until the pigment was smoothly dispersed. Separately 5 parts of low viscosity methyl cellulose were dispersed by stirring in 200 parts of hot water; 2 parts of a 10% aqueous solution of sodium bis(2-ethylhexyl) sulfosuccinate was added and the mixture cooled to room temperature, then mixed with the titanium dioxide dispersion in propylene glycol. Fifty-five additional parts of propylene glycol were added and the mixture stirred until a smooth uniform suspension was obtained. The suspension was used in the pigment printer of 3,203,347. The marking composition was smoothly transferred onto the printing surface and transferred to the surface of a gelatin strip from which capsules were formed.

As the capsules were formed in the encapsulation machine and stripped from the residual web, the capsules were picked up by the air conveyor and transferred to tumbling drums. Capsules were manufactured in a flat oval size, the surface of which in finished form is approximately 493 square millimeters. (Capsules are about 21.8 mm. long and about 7.2 mm. in diameter.) Four thousand capsules were counted into a polyethylene tumbling barrel, the apparatus indexed and tumbled for 5 minutes to let the pigment set. Then 75 ml. of a dye solution containing 0.5% w./v. of FD & C Blue No. 1 in a 50% v./v. mixture of isopropanol and water was added. The capsules were tumbled for two minutes to smoothly and uniformly coat all of the capsules with the dye solution and then a current of room air was blown on the capsules for two minutes, at the end of which time all of the dye solution was either absorbed in the capsules or evaporated. Five grams of powdered stearyl alcohol was dusted on the surface of the tumbling capsules by hand, and during an additional two-minute tumbling period spread over the capsule surfaces. The entire operation was carried out at normal operating room conditions of 68 °F. and 35% relative humidity.

The capsules were transferred to trays and spread out in a single layer. The capsules were then put in a dry room and allowed to remain until dry. The capsules were uniformly and evenly dyed. The pigment marking stood out clearly against the dyed background.

Example 2

The dye in Example 1 is present to the extent of about 94 micrograms per capsule. The procedure of Example 1 is repeated using a concentration of 1.0% of FD & C Blue No. 1 in the dye solution. The capsules have about 188 micrograms per capsule and are a deeper blue than obtained in Example 1. The pigment marking stands out more clearly.

The run is repeated using 0.5% solution of FD & C Red No. 2, and containing 0.1% synthetic vanilla as a flavor. A red capsule is obtained. The pigment marking shows up clearly.

As typical of the ranges to be expected, the following is given as a table of certain commercial products showing the micrograms of dye used for gelatin dyeing where the entire gelatin formula is used, as compared with the quantity of dye per capsule with surface-dyed capsules.

TABLE I

| Capsule | Gelatin dyed standard (mcg.) | Surface dyed (mcg.) |
|---|---|---|
| M | 356 | 75 |
| N | 1,582 | 93.7 |
| O | 1,005 | 150 |
| P | 1,784 | 563 |
| Q | 880 | 250 |

Example 3

Capsules are produced as in Example 1, except that the pigment printing and final stearyl alcohol are omitted. The capsules are placed in trays having oriented slots, to line up the capsules, and each capsule is hand stamped, using rubber type, and the same pigment formula as in Example 1. The capsules are permitted to dry for 30 minutes, and are then coated with stearyl alcohol. An excellent white pigment marking sharply contrasting against a blue capsule is obtained.

Where not otherwise specified, in the claims, parts are by weight.

We claim:

1. An edible colored surface-dyed, identifying-indicia-pigment-marked soft gelatin capsule, the pigment marking of which stands out clearly against a contrasting uniformly and evenly dyed capsule surface, said capsule having been formed, filled, cut-out, and self-sealed from a continuous cast strip of undyed pressure sealable gelatin film, with a narrow stripe from the interior of the film remaining at the line of seal, and which stripe although undyed, or dye-free, may be colored by pigments selected from the group consisting of titanium dioxide, calcium-carbonate, barium sulfate, alumina iron oxide and charcoal, comprising: a one-piece filled gelatin composition shell having medicament therein identified by said indicia; and on the surface only of the shell, and coloring the entire surface of the shell, including parts thereof previously imprinted with contrasting pigmented indicia, an edible alcohol-water-soluble surface dye, approved for food, drug and cosmetic use, pre-selected to contrast against the previously imprinted pigmented indicia, wherein the entire surface dye content for a given color value is not more than 30% of the dye content required to uniformly film-dye the entire gelatin film of the shell throughout; and a separate sharply contrasting pigmented printed indicia, on parts only of the surface of the gelatin capsule, consisting of a non-toxic alcohol-insoluble pigment, selected from the group consisting of titanium dioxide, calcium carbonate, barium sulfate, charcoal, iron oxide, and the insoluble lakes of dyes toxicologically approved for food, drug and cosmetic use, bonded to the surface of the gelatin capsule, with an effective amount of a film-forming water-soluble, non-toxic cellulose derivative, selected from the group consisting of hot-water dispersed low viscosity methyl cellulose, having a methoxyl content of from 20% to 32%, and sodium carboxymethylcellulose, which bond is rub and chip resistant, and flexible, without being brittle, said pigment and cellulose derivative having been penetrated into the gelatin surface with an effective amount of a gelatin penetration agent consisting essentially of water and propylene glycol, glycerin, sorbitol, or liquid polyethylene glycol, and hardened sufficiently to permit said subsequent surface dye coloration, the rate of pigment and cellulose derivative penetration into the undyed surface of the gelatin having been increased with an effective amount of a water-soluble, non-toxic wetting agent consisting essentially of sodium bis(2-ethyl-hexyl) sulfosuccinate, polyoxyethylene sorbitan monooleate, polyoxyethylene stearate, polyoxyethylene-polyoxypropylene condensation polymer, or sodium lauryl sulfate.

References Cited

UNITED STATES PATENTS 1,701,811  2/1929  Keller _____ 424—6

LEWIS GOTTS, *Primary Examiner.*

S. K. ROSE, *Assistant Examiner.*

U.S. Cl. X.R.

117—12, 38, 43; 156—277, 384; 161—97, 138, 413; 264—78, 129, 132, 245; 424—7, 14, 37